(12) United States Patent
Barillet

(10) Patent No.: US 11,441,931 B2
(45) Date of Patent: Sep. 13, 2022

(54) METHOD FOR OPERATING A MAGNETOINDUCTIVE FLOWMETER

(71) Applicant: IFM ELECTRONIC GMBH, Essen (DE)

(72) Inventor: Alain Barillet, Eriskirch (DE)

(73) Assignee: IFM ELECTRONIC GMBH, Essen (DE)

( * ) Notice: Subject to any disclaimer, the term of this patent is extended or adjusted under 35 U.S.C. 154(b) by 170 days.

(21) Appl. No.: 16/968,637

(22) PCT Filed: Feb. 12, 2019

(86) PCT No.: PCT/EP2019/053441
§ 371 (c)(1),
(2) Date: Aug. 10, 2020

(87) PCT Pub. No.: WO2019/155084
PCT Pub. Date: Aug. 15, 2019

(65) Prior Publication Data
US 2020/0400471 A1 Dec. 24, 2020

(30) Foreign Application Priority Data
Feb. 12, 2018 (DE) ...................... 10 2018 103 028.2

(51) Int. Cl.
*G01F 1/58* (2006.01)
*G01F 1/74* (2006.01)
*G01F 25/10* (2022.01)

(52) U.S. Cl.
CPC .............. *G01F 1/584* (2013.01); *G01F 1/586* (2013.01); *G01F 1/74* (2013.01); *G01F 1/58* (2013.01); *G01F 25/10* (2022.01)

(58) Field of Classification Search
CPC . G01F 1/584; G01F 1/586; G01F 1/74; G01F 25/10; G01F 1/58
See application file for complete search history.

(56) References Cited

U.S. PATENT DOCUMENTS

2008/0016967 A1 1/2008 Schrag et al.
2009/0120203 A1 5/2009 Schrag et al.
(Continued)

FOREIGN PATENT DOCUMENTS

CN 101424652 A 5/2009
CN 104019860 A 9/2014
(Continued)

*Primary Examiner* — Randy W Gibson
*Assistant Examiner* — John M Royston
(74) *Attorney, Agent, or Firm* — Harness, Dickey & Pierce, P.L.C.

(57) ABSTRACT

The disclosure relates to a magnetoinductive flowmeter. In order to detect gas bubbles in a measuring tube, and thus an incompletely filled measuring tube, the control signal with which the magnetic field generating device is actuated is designed as an alternating rectangular pulse with time delays. A first pulse time delay is provided after a positive rectangular pulse and a second pulse time delay is provided after a negative rectangular pulse during one period, wherein no magnetic fields are provided during the pulse time delays. The measurement signal is evaluated during the duration of the rectangular pulses (MB+, MB−) in order to ascertain the flow speed of the medium and during the duration of the time delays (Mess1, Mess2) in order to monitor the functionality, wherein the impedence between the two measurement electrodes is ascertained via the noise level of the measurement signal during the time delays (Mess1, Mess2), and the noise level of the measurement signal during the time delays (Mess1, Mess2) is a measurement of a malfunction, the impedance between the two measurement electrodes being influenced by air bubbles or foreign particles in the measurement medium.

5 Claims, 2 Drawing Sheets

(56) References Cited

U.S. PATENT DOCUMENTS

Figure 1:
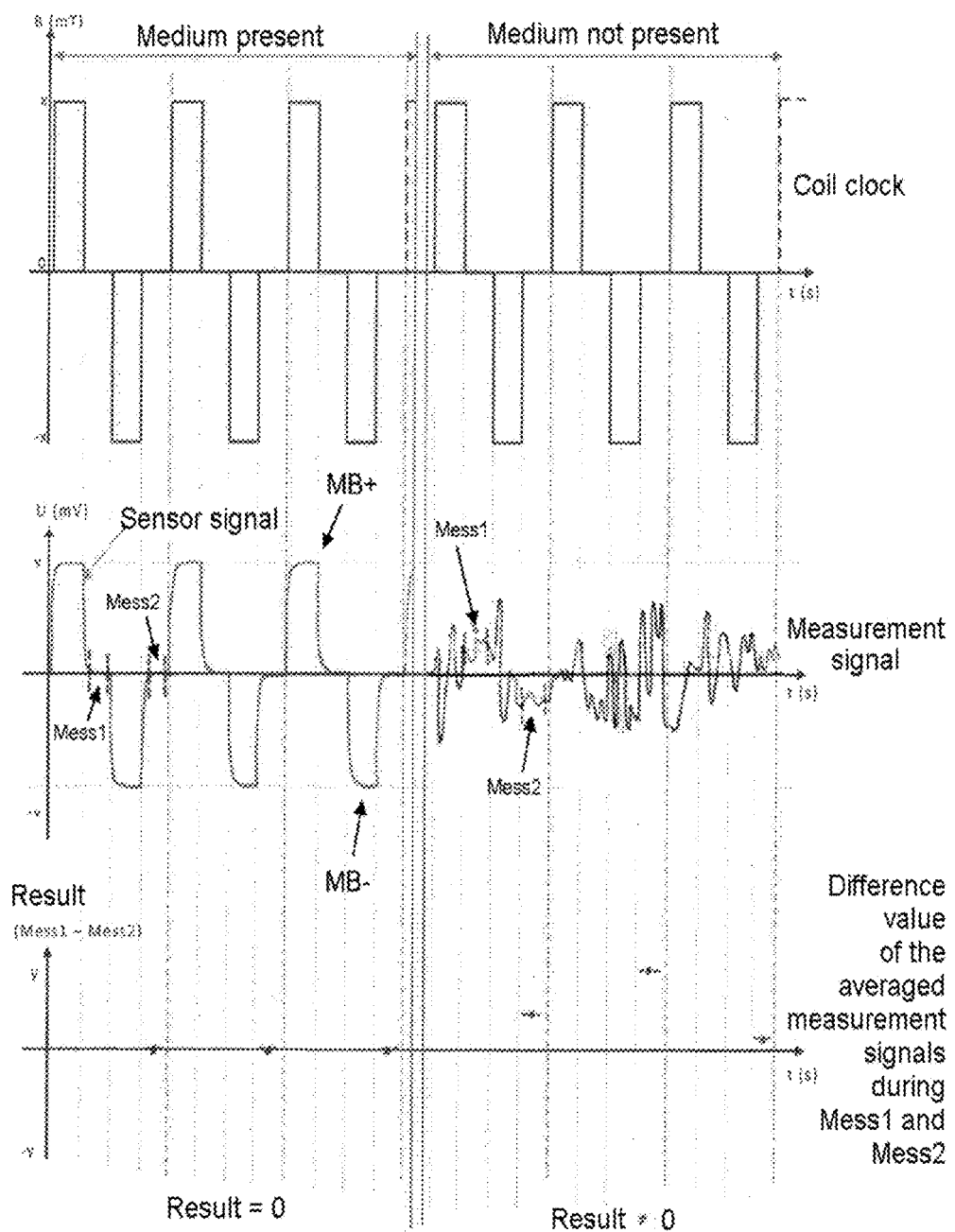

2012/0160036 A1* 6/2012 Henry .................. G01F 1/84
 73/861.356
2014/0033826 A1 2/2014 Reichart et al.

FOREIGN PATENT DOCUMENTS

| | | |
|---|---|---|
| DE | 102007052047 A1 | 5/2009 |
| DE | 102010001993 A1 | 8/2011 |
| DE | 102012015038 B3 | 11/2013 |
| DE | 102007052047 B4 | 6/2014 |
| JP | H03257327 A * | 11/1991 |
| JP | H0868676 A * | 3/1996 |
| WO | 2012066372 A1 | 5/2012 |
| WO | 2017053934 A1 | 3/2017 |

* cited by examiner

METHOD FOR OPERATING A MAGNETOINDUCTIVE FLOWMETER

CROSS-REFERENCE TO RELATED APPLICATIONS

This application is a U.S. National Phase Application under 35 U.S.C. 371 of International Application No. PCT/EP2019/053441, filed on Feb. 12, 2019, which claims the benefit of German Patent Application No. 10 2018 103 028.2, filed on Feb. 12, 2018. The entire disclosures of the above applications are incorporated herein by reference.

FIELD

The disclosure relates to a method for operating a magnetoinductive flowmeter as claimed in the preamble of claim 1.

BACKGROUND

This section provides background information related to the present disclosure which is not necessarily prior art.

Magnetoinductive flowmeters, the functioning of which is based on the principle of electromagnetic induction (=Faraday induction), have been known for many years and are used extensively in industrial metrology. According to the law of induction, in a flowing medium that carries along charge carriers and flows through a magnetic field, an electric field strength arises perpendicular to the flow direction and perpendicular to the magnetic field. In magnetoinductive flowmeters the law of induction is exploited by virtue of a magnetic field being generated by means of a magnetic field generating device, which usually has two energized solenoids, said magnetic field being guided at least partly through the measuring tube, wherein the magnetic field generated has at least one component extending perpendicularly to the flow direction. Within the magnetic field, each volume element of the flowing medium that moves through the magnetic field and has a certain number of charge carriers, with the field strength that arises in said volume element, makes a contribution to a measurement voltage that can be tapped off via the electrodes.

Since the induced voltage tapped off via the electrodes is proportional to the flow velocity of the medium averaged over the cross section of the measuring tube, the volumetric flow rate can be directly determined from the measured voltage given a known diameter of the measuring tube. A prerequisite for the use of a magnetoinductive flowmeter is merely a minimum conductivity of the medium. Moreover, it must be ensured that the measuring tube is filled with the medium at least to an extent such that the level of the medium lies above the measuring electrodes. However, since a not inconsiderable measurement error can occur with incompletely filled measuring tubes, depending on the degree of filling, magnetoinductive flowmeters are optimally suitable primarily for applications in which the measuring tube is completely filled. For this reason, magnetoinductive flowmeters in practice usually have a measuring device for empty tube recognition, which indicates to the user if the degree of filling has fallen to such an extent that the measurement value determined can no longer be ascertained with the required accuracy. This may for example already be the case with a measuring tube having been filled only two thirds full, such that the measuring devices for "empty tube recognition" that are used in practice do not generate a signal only when the measuring tube is actually "empty". Various solutions for recognizing incompletely filled measuring tubes are known. By way of example, reference should be made here to DE 102012015038 B3 and DE 102010001993 A1 in the name of the present applicant.

Matter adhering to the electrodes can also adversely influence the measurement result. In order to be able to carry out an accurate measurement despite adhering matter, JP H08-68 676 A proposes, inter alia, that, unlike previously, the signal used to drive the magnetic field generating unit is not embodied as a purely alternating rectangular pulse, but rather is embodied as an alternating rectangular pulse with pause times in which no magnetic field is present.

Measurement errors can furthermore also arise if gas bubbles are admixed with the medium to be measured. This may be caused in various ways, e.g. cavitation. DE 10 2007 052 047 B4 proposes in this regard that, in order to detect gas bubbles and/or particles in the measurement medium, the latter is subjected to a magnetic and/or electric field and the potential and/or the current are/is read out at one or more electrodes. The signal profile A(t) together with its signal-to-noise ratio is measured electronically as a function of time and the existence of gas bubbles and/or particles is deduced by means of a statistical evaluation. An analysis of the symmetry behavior of the signal profile A(t) is disclosed as statistical evaluation.

SUMMARY

This section provides a general summary of the disclosure, and is not a comprehensive disclosure of its full scope or all of its features.

It is an object of the disclosure to carry out the recognition of gas bubbles in the measuring tube and thus also of an incompletely filled measuring tube more simply and more cost-effectively.

The object is achieved by means of a method having the features of claim 1. Advantageous configurations of the disclosure are specified in the dependent claims.

The disclosure consists in the magnetic field generating unit being driven with a signal consisting of alternating rectangular pulses, in the case of which—given an identical period duration—each positive and negative pulse duration is reduced and the reduced portion is replaced in each case by a pause time, in which no magnetic field is then present. The measurement signal is used for determining the flow velocity of the medium during the duration of the positive and negative rectangular pulses and for function monitoring during the duration of the pause times. In this case, the impedance between the two measuring electrodes is determined by way of the noise level of the measurement signal during the pause times.

In this case, the disclosure is based on the insight that the impedance between the two measuring electrodes is influenced by air bubbles or foreign particles in the measurement medium and, of course, also by air in the case of an unfilled or only partly filled measuring tube and the noise level of the measurement signal during the pause times is therefore a measure of malfunctions.

Advantageously, the measurement signal is sampled repeatedly during the pause times, preferably by an analog-to-digital converter, and from the detected samples a respective average value per pause time is formed, said average value then being representative of the samples detected in a pause time.

By forming the difference between the two average values in each period, it is evident whether the measuring tube is unfilled or only partly filled and whether there are air bubbles or foreign particles in the measurement medium. To that end, the difference magnitude determined is compared with a predefined first threshold value. In the case of a full measuring tube with a medium which is not provided with air bubbles or foreign particles, the difference is approximately zero. Otherwise it deviates from this value.

As an alternative to the threshold value comparison, it is also advantageous that the temporal profile of the difference values of adjacent periods is analyzed by forming the 1st derivative and in this case, particularly advantageously, the frequency of the events that lie above the second threshold value is also evaluated as well. It is only if this gradient value in a specific frequency lies above a predefined second threshold value that an unfilled or only partly filled measuring tube or a measurement medium provided with air bubbles or foreign particles can be reliably deduced. As a result, it is possible to filter out non-recurring outliers which do not per se represent a malfunction and, for example, may arise during a settling time after a switchover situation or stem from electrochemical processes.

Advantageously, a pause time corresponds to exactly one quarter of a period duration, that is to say that the positive and negative rectangular pulses and also the pause times respectively succeeding said rectangular pulses each have a duration of one quarter of a period.

Further areas of applicability will become apparent from the description provided herein. The description and specific examples in this summary are intended for purposes of illustration only and are not intended to limit the scope of the pre-sent disclosure.

DRAWINGS

The drawings described herein are for illustrative purposes only of selected embodiments and not all possible implementations, and are not intended to limit the scope of the present disclosure.

The disclosure is explained in greater detail below on the basis of exemplary embodiments with reference to the drawings.

Figure 2:
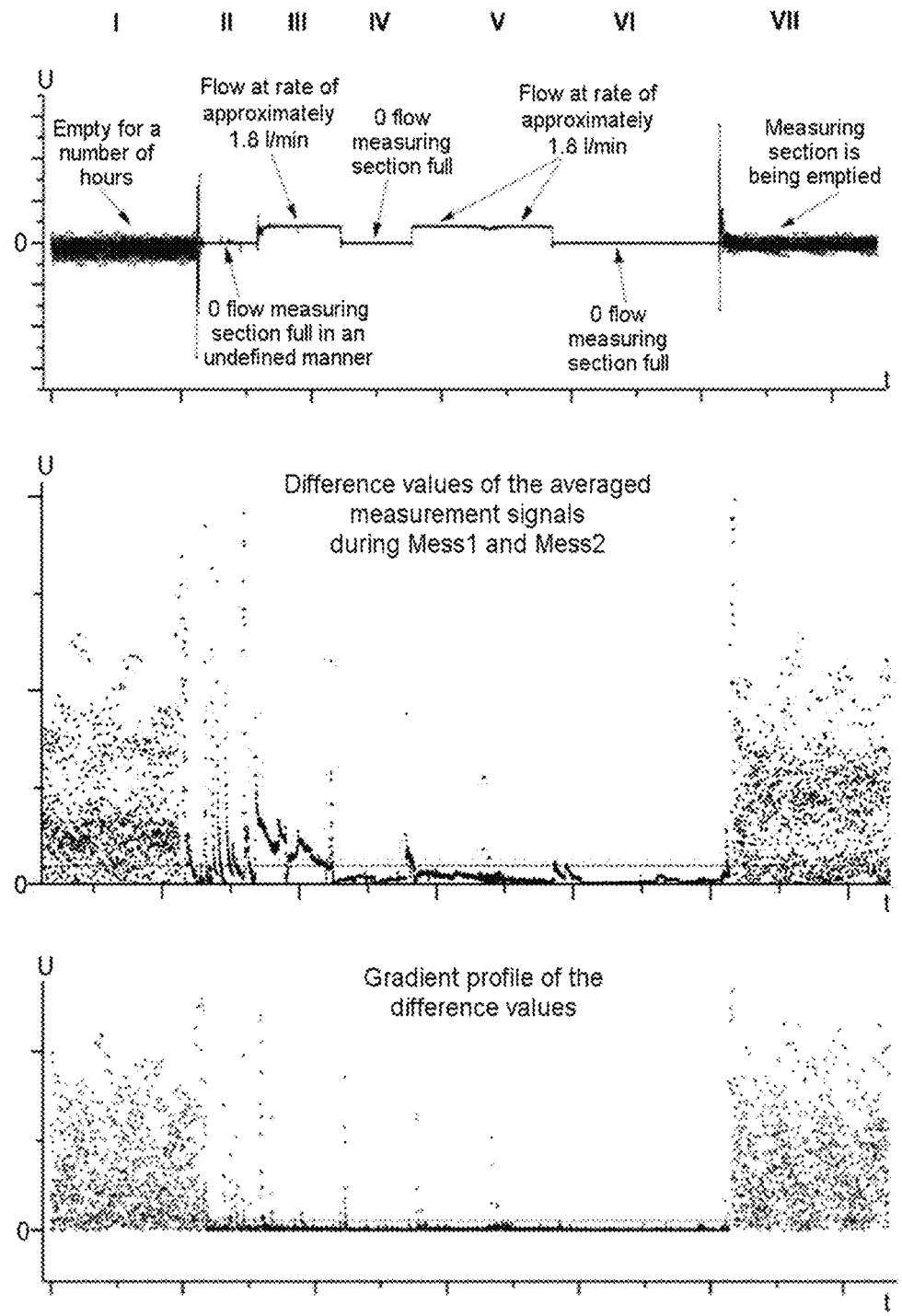

In the figures, schematically:

FIG. 1 shows coil clock signal and measurement signal and also the difference values of the averaged measurement signals and FIG. 2 shows a development of the disclosure with exemplary signal profiles.

Corresponding reference numerals indicate corresponding parts throughout the several views of the drawings.

DETAILED DESCRIPTION

Example embodiments will now be described more fully with reference to the accompanying drawings.

FIG. 1 schematically shows the various signal profiles over time when the measuring tube is completely filled (left) and when it is incompletely filled, empty or admixed with gas bubbles or foreign particles.

The coil clock signal is shown in the upper region. The special feature here is that, unlike previously, said signal is not embodied as a purely alternating rectangular pulse, rather that—given an identical period duration—each positive and negative pulse duration MB+, MB− is reduced and the reduced portion is respectively replaced by a pause time Mess1, Mess2, in which no magnetic field is then present.

Since the flow of the medium to be measured induces a voltage only when a magnetic field is present, it is thus the case that, as can be seen on the left in the middle region of FIG. 1, a sensor signal is established as a measure of the detected flow velocity or flow rate only in the first and third quarters of a coil clock period. In the second and fourth quarters of a coil clock period, the sensor signal immediately returns to the value 0 volts, wherein that represents an ideal value here since an offset voltage that is dependent on the medium to be measured but is fixed may be established in practice.

The period duration is 104 milliseconds, for example, that is to say that each quarter then lasts 26 milliseconds.

The illustration on the right in the middle region of FIG. 1 shows the sensor signal as noise signal that is established when the measuring tube is empty. The signal-to-noise ratio varies depending on the degree of filling of the measuring tube. Nevertheless, a signal that is detected in the case of an incompletely filled measuring tube is significantly noisier than in the case of a completely filled measuring tube.

The disclosure is based on the fact, then, that the noise is detectable with all the more difficulty, the greater the signal component, and that in the case of a very dynamic flow velocity, noise can also be interpreted incorrectly as a changing measurement signal. Therefore, two pause times Mess1, Mess2 are provided per coil clock period, in which pause times it can be made sure that all signals detected in these times are not voltage values induced by the flow, but rather stem from the noise owing to an incompletely filled measuring tube or measuring tube admixed with gas bubbles.

The sensor signals detected in said pause times Mess1, Mess2 of the coil clock signal are sampled repeatedly, preferably by an analog-to-digital converter, and from the detected samples a respective average value per pause time is formed, said average value then being representative of the samples detected in a pause time. A comparatively low sampling rate of 120 Hz, for example, is suitable for the sampling since, in the case of a noise signal, the average value is then not equal to zero.

The results of forming the difference between the average values from the pause times Mess1, Mess2 are illustrated schematically in the lower region. It is clearly evident that this difference formation yields the value zero throughout in the left-hand region, whereas significant deviations therefrom arise in the right-hand region. A comparison of these difference values with a predefined threshold value finally leads to a reliable statement about whether the measuring tube is full or else empty, partly filled, or admixed with air bubbles.

Even if the illustration of the sensor signal in the middle region is highly schematic, it nevertheless clearly reveals the basic concept of the disclosure by way of example. This is a decidedly inexpensive solution for recognizing air bubbles in the flow profile or empty tube recognition that does not require additional component parts or the like. Just the microcontroller that is present anyway in the measuring instrument is burdened with an additional computational task, although this does not constitute an appreciable detriment in practice given the available capacities of typical processors.

FIG. 2 illustrates an advantageous development of the disclosure on the basis of various process situations. The upper illustration shows the following situations:

I. The measuring tube is empty.
II. The measuring tube is full in an undefined manner, without flow.
III. Flow at rate of approximately 1.8 l/min.
IV. The measuring tube is full, but without flow.
V. Flow at rate of approximately 1.8 l/min.

VI. The measuring tube is full, but without flow.
VII. The measuring tube is empty.

The illustrations underneath respectively show the signal values determined or calculated in the respective situations I-VII, wherein the difference values of the averaged measurement signals during the pause times Mess1, Mess2 are illustrated in the middle illustration and the gradient profile of the difference values is illustrated in the lower illustration.

In the situations I and VII when the measuring tube is empty, the totally nonuniform distribution of the difference magnitudes is clearly evident, which allows a high noise component to be deduced. The dashed line in the middle illustration, which identifies the first threshold value, makes it clear that a simple recognition of a malfunction, i.e. of an empty measuring tube, is readily possible.

In the situations II, the measuring tube is full in an undefined manner, although no flow is present. This is intended to represent the filling process of the measuring tube, in the course of which the air situated in the measuring tube escapes. Afterwards, in the situation III, although the medium is flowing at a rate of approximately 1.8 l/min, nevertheless the settling process has not yet concluded, and so the middle illustration reveals that the first threshold value is distinctly exceeded, which would actually have to be interpreted as a malfunction. It is only by means of the evaluation of the temporal profile of the difference values of adjacent periods by forming the 1st derivative that these outliers are not interpreted as a malfunction, since the gradient profile lies below a predefined second threshold value, likewise illustrated as a dashed line. The outliers that are also evident in the lower illustration are filtered out by means of an evaluation of the frequency regarding how often the second threshold value is exceeded. By means of the frequency consideration, a malfunction is recognized only when the number of events lies above the second threshold value. The definition of the frequency is crucially based on empirical values and can be e.g. in the range of 15-20.

In the situation IV, the measuring tube is full, but no flow is present. Since the settling process has now concluded, in contrast to the situation II there is a "clean" signal and no outliers.

At the transition to the situation V, which represents a flow at a rate of approximately 1.8 l/min, here as well conspicuous elements are evident in the signals. However, these conspicuous elements are once again not malfunctions, but rather stem from the switchover or settling process. These short-term events can also be filtered out by means of the evaluation of the gradient profile in conjunction with the frequency consideration mentioned above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A method for operating a magnetoinductive flowmeter comprising a measuring tube consisting of a nonconductive material, in which the medium to be measured flows,
   comprising a magnetic field generating device for generating an alternating magnetic field that permeates the measuring tube substantially perpendicularly to the longitudinal axis of the measuring tube by virtue of the magnetic field generating device being driven with a periodic control signal,
   and comprising two measuring electrodes galvanically coupled to the medium for tapping off a voltage, which is amplified by an amplifier circuit having a high-impedance input to form a measurement signal that is dependent on the flow velocity when medium is flowing,
   wherein the control signal is embodied as an alternating rectangular pulse with pause times (Mess1, Mess2) and during a period there is a first pause time (Mess1) after a positive rectangular pulse (MB+) and a second pause time (Mess2) after a negative rectangular pulse (MB−) and no magnetic field is present during the pause times (Mess1, Mess2),
   wherein that the measurement signal is evaluated during the duration of the rectangular pulses (MB+, MB−) for the purpose of determining the flow velocity of the medium and during the duration of the pause times (Mess1, Mess2) for the purpose of function monitoring,
   wherein the impedance between the two measuring electrodes is determined by way of the noise level of the measurement signal during the pause times (Mess1, Mess2), and the noise level of the measurement signal during the pause times (Mess1, Mess2) is a measure of malfunctions, wherein the impedance between the two measuring electrodes is influenced by air bubbles or foreign particles in the measurement medium,
   wherein the measurement signal is sampled repeatedly during the pause times (Mess1, Mess2) and from the detected samples a respective average value per pause time is formed,
   wherein the difference between the two average values is formed per period.

2. The method as claimed in claim 1, wherein that the difference value between the two average values is compared with a first threshold value.

3. The method as claimed in claim 1, wherein the temporal profile of the difference values of adjacent periods is analyzed by forming the 1st derivative and is compared with a second threshold value.

4. The method as claimed in claim 3, wherein that the frequency of the events that lie above the second threshold value is evaluated.

5. The method as claimed in claim 1, wherein that the pause times each correspond to one quarter of a period duration.

\* \* \* \* \*